Jan. 3, 1961 R. W. TRIPP 2,967,017
DIGITAL TO ANALOG CONVERTER OF ANGULAR VALUES
Filed July 3, 1956
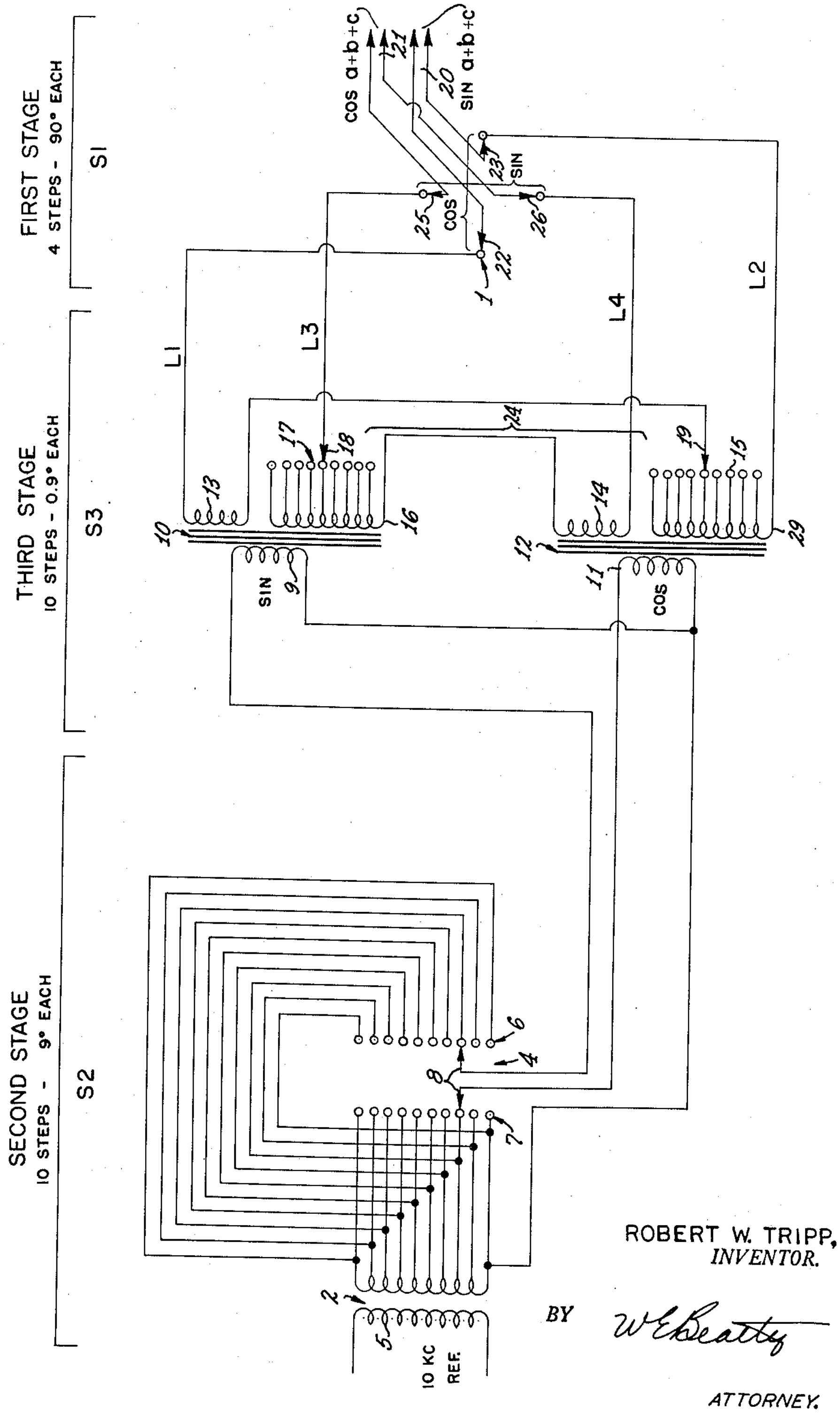
ROBERT W. TRIPP,
*INVENTOR.*
BY W. E. Beatty
*ATTORNEY.*

United States Patent Office 2,967,017

Patented Jan. 3, 1961

2,967,017

DIGITAL TO ANALOG CONVERTER OF ANGULAR VALUES

Robert W. Tripp, Bronxville, N.Y., assignor to Inductosyn Corporation, Carson City, Nev., a corporation of Nevada Filed July 3, 1956, Ser. No. 595,788

5 Claims. (Cl. 235—154)

The invention relates to a computer for angular data, or to a digital to analog converter of angular values. The invention provides for computing the sine and cosine values of an angle represented by the sum of the angles selected at a plurality of decimally related stages, each having a plurality of steps controlled by a switch.

An object of the invention is to simplify the switching arrangement for obtaining sine and cosine values of an angle represented by the sum of the angles selected at a plurality of these stages.

The present computer or digital to analog converter is an improvement over the corresponding device disclosed and claimed in application S.N. 540,429, filed October 14, 1955 for Automatic Machine Control, now Patent 2,849,668, and assigned to the assignee of the present application. That application discloses and claims generically the computer disclosed herein, and also discloses and claims its use as an element of automatic machine control. In that application it is pointed out that data elements are employed in a servo system for obtaining a shaft position, the digital input information being supplied in terms of angles, such information being converted into sine and cosine values for application to quadrature windings which drive the data element to the angular position set up in the input. It is also pointed out that if we have one stage of equal resistances of value 10R in each of 10 steps and another stage of 10 steps each having a value 1R, it is thus possible to obtain 100 different values of resistance by simple addition whereas in the case of trigonometric functions $$\sin (a+b)=\sin a \cos b+\cos a \sin b \quad (1)$$
$$\cos (a+b)=\cos a \cos b-\sin a \sin b \quad (2)$$

The application S.N. 540,429 discloses a digital to analog converter for representing a shaft position wherein the angular data is supplied in 3 stages, one stage of 10 steps each having a value sin 36°, also 10 steps cos 36°, a second stage of 2 transformers each having 2 secondary windings, 2 of which have 10 steps each of values sin 3.6° and the other 2 having 10 steps each having a value cos 3.6°, and a third stage of 2 transformers each having 2 secondary windings, 2 of which each have 10 steps of values sin 0.36° and the other 2 each having 10 steps of values cos 0.36°, the transformers performing the multiplication terms in Equations 1 and 2 while the addition and subtraction is obtained by the proper selection of leads.

Application S.N. 540,429, now Patent No. 2,849,668, also discloses and claims a converter wherein the number of switches required at the second and third stages can be reduced and this was shown by dividing the right hand side of each of the above Equations 1 and 2 by cos $b$, resulting in the following expressions $$\tan b \cos a+\sin a \quad (3)$$
$$\cos a-\tan b \sin a \quad (4)$$

The ratio represented by the Expressions 3 and 4 can be used for certain digits where the corresponding vector angle of the resolver is small.

Even with the simplification corresponding to Expressions 3 and 4, the pending application involves at least 10 steps at each of the 3 stages.

The present invention can be applied to the form represented by Equations 1 and 2, but is here illustrated as applied to the form represented by Expressions 3 and 4 and in so doing provides a simplification in that it is unnecessary to provide 10 steps at one of the stages.

According to the present invention, it is recognized that all of the sines and cosines for 90° steps are either unity or zero and hence one stage according to the present invention simply involves a 4-position switch having 4 steps of 90° each. While this in effect is the first stage, it is connected to the output of the third stage which has 10 steps of 0.9° each, the third stage being fed by what corresponds to the first stage of S.N. 540,429, now Patent No. 2,849,668, namely a transformer secondary having sine and cosine taps, but instead of having a value of 36° for each step, according to the present invention as this is used as the second stage, each step has a value of 90°. Thus by operating the 4-position switch at the first stage and by selecting the position of the step switches at the second and third stages, one may obtain values of sine and cosine currents for any angle from zero to 360° in steps of 0.9°.

For further detail of the invention reference may be made to the drawings wherein Fig. 1 is a schematic circuit showing a digital to analog converter according to the present invention.

In a multiple speed servo system including a digital input and digital to analog converter operating with a rotary data elements, certain choices of speed for the respective data elements lead to the maximum simplicity of the converter.

Where the Linear Inductosyn is employed as the fine data element the cycle is established at 0.1 inch. The cycle for the medium should be $10^N$ times as great where N is an integer. A value of $N=2$ is convenient since an overlap of one decade from medium to fine is desirable and this requires an accuracy of 1/1000 for the medium which is readily obtained. A value of $N=1$ can also be used where a short system is desired.

Likewise, the coarse data element cycle can be 10 or 100 times that of the medium. A converter from digital (decimal) to rotary analog is disclosed and claimed in application S.N. 540,748, filed October 17, 1955 for Automatic Shaft Control, now Patent 2,839,711.

In general, the useful length of the controlled motion is less than ½ the coarse cycle, in order to avoid false servo motion direction.

Where the length permits, the use of a cycle of 4 or 40 times the medium results in further simplification. Since the first division of the cycle is into 4 parts, this can be accomplished by switching the sine and cosine, outputs of the converter, observing the proper sign. This is accomplished by switch 1 at the first stage S1. No transformers are required in this stage. The second stage S2 divides 90° of cycle into 10 parts. No sign changing is required and a single transformer indicated at 2 with a double set of 10 taps indicated at 6 and 7 of a switch 4 will supply both sine and cosine voltages. The primary 5 of this transformer 2 is excited by the reference voltage, for example 10 kc. as indicated. The output of this transformer 2 feeds the third stage S3 which feeds the first stage S1.

In the second stage S2, the switch 4 is preferably a rotary switch and as disclosed in the applications referred to above, it may have a stepping magnet which hunts for and finds a position corresponding to the value or digit of the angle represented by a hole in punched tape or other control. The switch 4 has a row of contacts indicated at 6 which are connected to points 90 electrical degrees from the contacts in the row indicated at 7 so that the wiper 8 in any one position picks off both the sine and the cosine values of the angle selected in multiples of 9 degrees. The sine value for example is supplied to the primary winding 9 of a transformer 10, and the cosine value is supplied to the primary winding 11 of a transformer 12. Transformer 10 has a secondary winding 13 for the sine value of Expression 3 to which is added the product of the cosine value and the tangent value of Expression 3, transformer 12 having a secondary winding 29 having taps indicated at 15 in steps of the tangent of multiples of 0.9°, whereby the lines indicated at L1 and L2 supply to the switch 1 a value proportional to the sine of the sum of the selected multiple of 9° plus the selected multiple 0.9°.

In like manner the cosine value of the selected multiple of 9° is supplied to the secondary winding 14 and from this is subtracted the sine value of that angle in the secondary winding 16 multiplied by the tangent of the multiple of 0.9° selected by the particular tap in the group indicated at 17. The output lines L3 and L4 thus supply to switch 1 values proportional to the cosine of the sum of the angles selected at second and third stages S2 and S3.

Line L3 has a wiper 18 for the contacts 17 and the contacts 15 have a wiper 19, these contacts 15 and 17 and their wipers 18 and 19 preferably being embodied in a rotary switch indicated at 24 which may be brought to its selected position by a stepping magnet under control of the digital input for its stage as described in connection with switch 4 for the second stage S2. Likewise, the switch indicated at 1 may also be a rotary switch having a stepping magnet controlled by the digital input for its stage S1. If desired, reference may be made to both of the above mentioned patent applications for details of the digital input and also for details of operating circuits for the stepping switches, such details not being disclosed herein as the present invention is not dependent upon the manner in which the switches 1, 4 and 24 at the various stages are moved to a selected position or step. For example, S.N. 540,429, now Patent No. 2,849,668, Fig. 2, shows the transformer assembly with digital input for obtaining co-function values of the sums of two angles. The digital input is there shown as manually operable switches, digitally operated stepping switches also being shown at 182 in Fig. 4 and at corresponding locations 183 to 187 for Figs. 5 to 9. In S.N. 540,748, now Patent No. 2,849,668, digitally operated switches are shown at 101 and 102, Fig. 1; 104, Fig. 2; 105, Fig. 5; 106, Fig. 4; 107, Fig. 3, a push button or card reader being indicated.

If we assume that switch 1 is in the zero position as shown, then the sine value from lines L1 and L2 is lead to the output line 20 while the cosine value in lines L3 and L4 is lead to the output line 21, the values in question being in the first quadrant and determined by the angles selected for stages S2 and S3, the angle selected by S1 being zero. In the first quadrant as shown, the values of sine and cosine are both +, represented by connection of wiper 22 to line L1 and wiper 23 to line L2 for the sin circuit 20 and by the connection of wiper 25 to line L3 and wiper 26 to line L4 for the cos circuit 21.

If switch 1 is rotated one step clockwise from the position shown, this adds 90° to the value selected by stages S2 and S3, for angles in the second quadrant where the sine of $90+a$ has the same value as the cosine of $a$ and is positive in value, while the cosine of $90+a$ is the same value as the sine of $a$ and is negative in value. Accordingly, the cosine value in lines L3 and L4 now emerges as the sine equivalent on line 20 without the reversal of sign, with wipers 22 and 23 connected to lines L3 and L4 respectively, while the sine value on lines L1 and L2 emerges as the cosine equivalent on line 21 with reversal of connection, with wiper 26 connected to line L1 and wiper 25 connected to line L2.

The sine and cosine of an angle less than 90°, plus 180° is in the third quadrant and the same in value as the sine and cosine of that angle, both being negative in value, and this condition prevails when switch 1 is rotated 2 steps (180°) from the position shown, as this serves to connect lines L3 and L4 to line 21 in reverse and also connect lines L1 and L2 to line 20 in reverse.

In like manner, if switch 1 is rotated three steps clockwise from the position shown, this adds 270° to the angle selected in the second and third stages S2 and S3 for angles in the fourth quadrant where the values are the same as in the second quadrant but reversed in sign, the cosine now being positive and the sine negative. These values are obtained in the fourth position of switch 1, with wiper 25 connecting line L1 and wiper 26 connecting line L2 for the output on line 21 of the positive sine value in lines L1 and L2 as the equivalent cosine value, and with wiper 22 connected to line L4 and wiper 23 connected to line L3 to transmit the cosine value in line L3 and L4 reversed in sign as the sine value on line 20.

If $a$, $b$ and $c$ represent the angles selected in the first, second and third stages respectively, by operating the respective switches 1, 4 and 24, then line 20 supplies the value sine $a+b+c$ and the line 21 supplies the value cosine $a+b+c$.

Various modifications may be made in the invention without departing from the spirit of the following claims.

I claim:

1. An array of electrical transformers adapted to provide analog voltages representing the sine and cosine of the sum of two angles referred to as first and second angles, comprising a first transformer having an input of a voltage proportional to the sine of the first angle and having output windings with ratios corresponding to unity and to the tangent of the second angle, a second transformer having an input of a voltage proportional to the cosine of the first angle and having output windings with ratios corresponding to unity and to the tangent of the second angle, a circuit additively connecting the unity winding of the first transformer to the tangent winding of the second transformer, a circuit subtractively connecting the tangent winding of the first transformer to the unity winding of the second transformer, a set of output leads for each of said circuits and switching means for interchanging and reversing the connections of said circuits to said output leads in steps to change the voltage values by steps in said output leads respectively to amounts corresponding to the sum of the angles represented by the electrical values of said circuits and a multiple of 90° corresponding to the selected step.

2. An array of electrical transformers according to claim 1 comprising another transformer having a reference potential input and supplying voltage values in a series of steps proportional to said sine and cosine values of said first angle, said output windings of said first and second transformers each having steps, the steps of said other transformer and the steps of said output windings being decimally related to each other and to 90°.

3. Computer apparatus adapted to provide analog voltages representing the sine and cosine of the sum of two angles referred to as first and second angles, comprising a first transformer having an input of a voltage proportional to the sine of the first angle and having two output windings with ratios corresponding to different trigonometrical functions of the second angle, said output windings supplying values proportional to the product of the sine of the first angle and said trigonometrical functions of the second angle, a second transformer having an input of a voltage proportional to the cosine of the first angle and having two output windings with ratios corresponding to said trigonometrical functions of the second angle, said last mentioned output windings supplying values proportional to the product of the cosine of the first angle and said trigonometrical functions, a circuit additively connecting one winding of the first transformer to the other winding of the second transformer and comprising means supplying electrical values proportional to the sine of the sum of the first and second angles, a circuit subtractively connecting the other winding of the first transformer to the one winding of the second transformer and comprising means supplying electrical values proportional to the cosine of the sum of said first and second angles, a set of output leads for each of said circuits and switching means for interchanging and reversing the connections of said circuits to said output leads in steps to change the electrical values by steps in said output leads respectively to amounts corresponding to the sum of the angles represented by the electrical values of said circuits and a multiple of 90° corresponding to the selected step.

4. A computer apparatus comprising two pairs of lines, means for supplying to said lines any desired one of a plurality of electrical signals having values respectively corresponding to co-function trigonometrical values of an angle, each line of said pair terminating in a terminal of switching means with all such terminals in a circular array with the terminal of each line diametrically opposite the other terminal of that line and with the terminals of each line arranged on a line at right angles to the terminals for the other line, two pairs of output circuits with the circuit of each pair terminating in a rotary contact of said switching means and with the contacts of each circuit diametrically opposite each other and with the circuit contact pairs arranged linearly at right angles to each other, said switching means having four rotary positions in each of which each of said pair of lines is connected to one pair of said output circuits, said switching means comprising means providing in said output circuits electrical signal values corresponding to the co-function values in said pairs of lines plus a multiple of 90° corresponding to the rotary position of said contacts.

5. A computer apparatus comprising two pairs of lines, means for supplying to said lines respectively any desired one of a plurality of values of electrical signals corresponding to the sine and co-sine values of an angle, two pairs of output circuits, and means comprising a four position switch for connecting each of said pairs of lines to one of said pairs of output circuits to provide in said output circuits signal values corresponding respectively to the sine and co-sine values in said pairs of lines plus a multiple of 90° depending upon the position of said switch, said switch having one position wherein the lines of one of said pairs of lines is connected in a certain sense to one of said pairs of circuits and the other pair of said lines is connected in a certain sense to the other pair of said circuits, said switch having a second position wherein the connection of said pairs of output circuits to said pairs of lines respectively is interchanged with respect to the connection in said one position, said switch having a third position wherein the connections are the same as in said one position with reversal of the connection of the member of each pair of said output circuits to its said line, said switch having a fourth position with reversal, respecting said second position, of the connection of the member of each pair of said output circuits to its said line.

References Cited in the file of this patent

UNITED STATES PATENTS

| | | |
|---|---|---|
| 2,467,646 | Agins | Apr. 19, 1949 |
| 2,781,967 | Spencer et al. | Feb. 19, 1957 |

OTHER REFERENCES

"Network for Digital-to-Analogue Shaft Position Transducers," O'Neil, March 1954, AIEE Transactions, vol. 73, part I, pages 456–466 of interest.